United States Patent Office 3,490,153
Patented Jan. 20, 1970

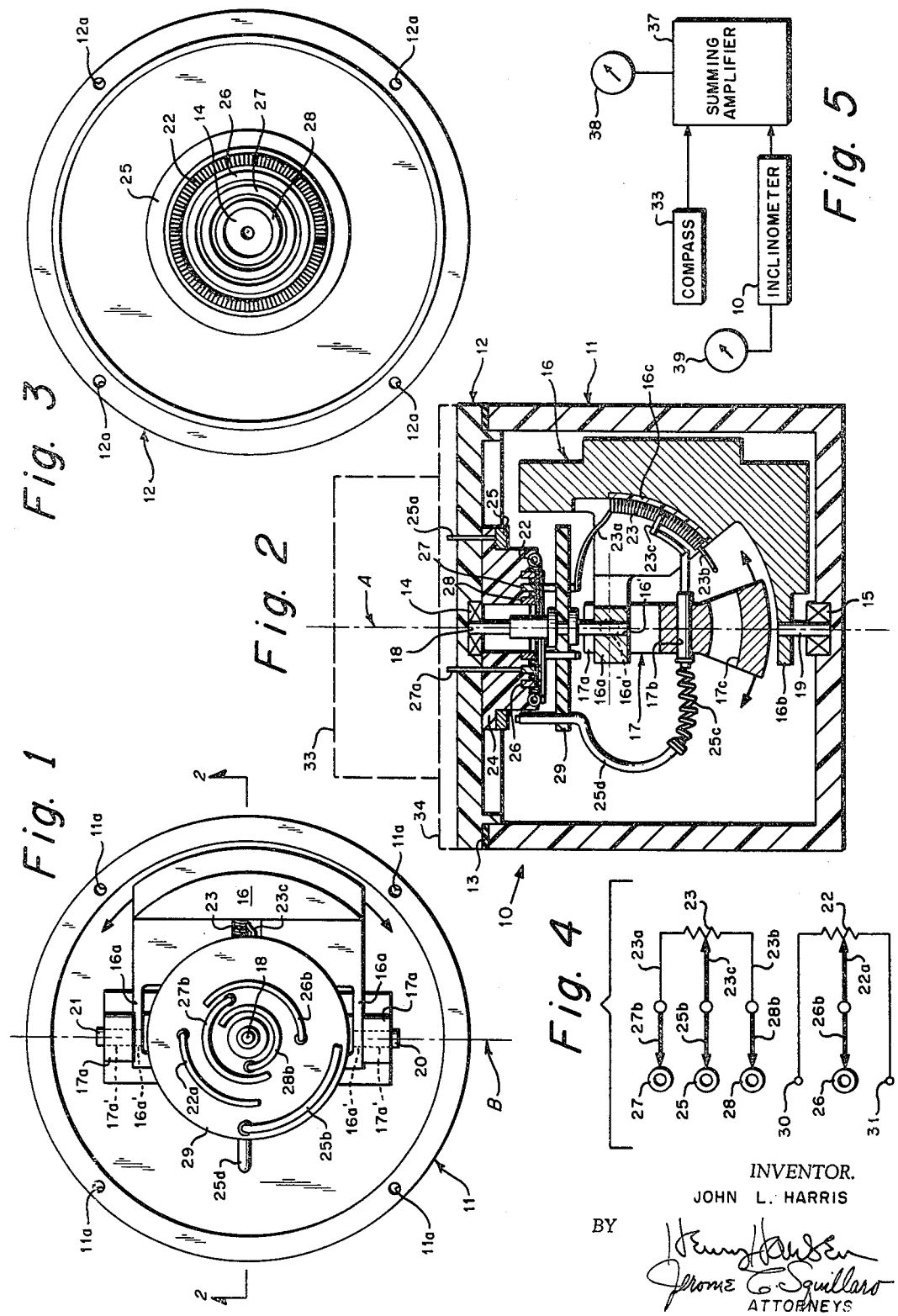

---

3,490,153
INCLINOMETER
John L. Harris, Box 199, Ivyland, Pa. 18974
Filed Feb. 27, 1967, Ser. No. 619,540
Int. Cl. G01c 9/16
U.S. Cl. 33—215      7 Claims

ABSTRACT OF THE DISCLOSURE

A device for continuously measuring the magnitude and direction of inclination along a central axis passing through the device with respect to the earth's gravity vector by the use of two orthogonally positioned pendulums and associated sensors and automatically indicating the azimuthal position of the device relative to a reference. The pendulums are arranged such that the first rotates freely about a vertical axis concentric with the central axis of the device while the second pendulum rotates about orthogonal axis perpendicular to said central axis and is constrained in its degree of rotation by said first pendulum.

---

The invention described herein may be manufactured and used by or for the Government of the United States of America for governmental purposes without the payment of any royalties thereon or therefor.

BACKGROUND OF THE INVENTION

The present invention relates to measuring devices and more particularly, to a device for measuring the magnitude and direction of inclination from a reference.

In the field of underwater sound detection, it has been the general practice to employ acoustic transducers or hydrophones to detect submerged objects. Various arrangements of these hydrophones have been utilized in an effort to obtain directional response characteristics. For example, line-type hydrophone arrays as suggested in U.S. Patent No. 1,584,613 to Comstock et al. have been utilized for obtaining response characteristics in a plane perpendicular to the longitudinal exis of a transducer array. So that such an array may be successfully employed however, it is necessary that the array not deviate from a vertical line passing through the earth's center of gravity except within certain known angular limits. Most transducer arrays, however, are subjected to ocean currents which cause the array to tilt as a direct function of the velocity of the array with respect to the velocity of the ocean current. The higher the difference in relative velocities, the higher or larger tilt angle will be encountered. The net effect is to cause the acoustic response characteristics of the hydrophone array to deviate from the horizontal by an amount proportional to the angle of inclination and thereby reduce the detection capabilities of the system. This condition is illustrated in U.S. Patent No. 3,082,400 to Coop. Accordingly, it is necessary to know both the magnitude of the inclination and the direction or azimuth angle thereof so that the performance of the hydrophone array can be evaluated.

Prior art techniques for measuring inclination have required manual computations of output signals from various sensors and hence, reqired a considerable amount of time and effort in their use. Another technique has been to use vertical gyroscopes for obtaining similar outputs which also must be vectorially summed. This latter technique is generally more space consuming than that previously described, and in addition, is subject to inaccuracies caused by gyoscopic precession.

SUMMARY OF INVENTION

The general purpose of the present invention is therefore to provide an inclinometer which possesses all of the advantages of prior art devices and none of the aforedescribed disadvantages. To attain this, the present invention contemplates an orthogonal arrangement of pendulums for continuously measuring the magnitude and direction of inclination along a central axis passing through the inclinometer with respect to the earth's gravity vector. By this arrangement, both the magnitude and direction of inclination are readily obtainable from a single device which has high sensitivity and resolution characteristics, even at small angular excursions, and which has no drift associated therewith. Further, the invention provides a totally integrated compact assembly in which the mass of one pendulum enables the measurement of the magnitude of inclination and the mass of both pendulums enables the measurement of the direction of inclination. In addition, by using a magnetic compass in conjunction with the invention, it is possible to provide the magnitude and direction of inclination of a device relative to a point of reference external to the device.

An object of the invention is therefore to provide an apparatus for remotely and continuously measuring the magnitude and direction of inclination from a point of reference.

Other objects and many of the attendant advantages of this invention will be readily appreciated as the same becomes better understood by reference to the following detailed description when considered in connection with the accompanying drawing in which like reference numerals designate like parts throughout the figures thereof.

BRIEF DESCRIPTION OF DRAWING

FIG. 1 shows a top view of an embodiment of the invention with the top cover removed therefrom;

FIG. 2 illustrates a cross-sectional elevation of the device taken along the line 2—2 of FIG. 1 looking in the direction of the arrows;

FIG. 3 illustrates an inside view of the top cover;

FIG. 4 is a schematic diagram of the electrical connections of the present invention; and FIG. 5 illustrates in block diagram form an apparatus for obtaining bearing information.

DESCRIPTION OF PREFERRED EMBODIMENT

Referring now to the drawing, there is illustrated in FIG. 1 an embodiment of the invention as viewed from the top with the top cover removed therefrom. Taken with the cross-sectional elevational view of FIG. 2, there is illustrated an inclinometer assembly 10 having a cylindrically shaped thin-walled housing member 11 with tapped holes 11a spaced about the top edge and a top closure plate 12 having apertures 12a (illustrated in FIG. 3) in alignment with the tapped holes 11a. An annular shaped sealing ring 13 is positioned between the perimeter of the closure plate 12 and the top edge of the housing member 11; with the aid of screws (not shown) passed through the apertures 12a into tapped holes 11a, a hermetic seal is provided for the inclinometer assembly. Concentrically positioned within the inner surface of the closure plate 12 and the bottom of the housing member 11, along a central axis passing longitudinally through the inclinometer assembly, generally indicated by the letter A, are two pivotal points or bearigns 14 and 15, respectively. Bearings 14 and 15 are preferably of the low-friction type such as watch bearings.

Pivotally mounted between the bearings 14 and 15 is a tilt sensing assembly comprising two orthogonally disposed eccentric weights or pendulums 16 and 17. Pendulum 16 is a substantially solid rectangular mass having its outer edge (proximate the inner wall of the housing member 11) arcuately shaped with a radius of curvature centered about the central axis A. Extending horizontally in the same direction from the upper portion of the mass are two spaced apart arms 16a, having an aperture 16a' in each arm concentrically aligned with an axis B, orthogonal to the central axis A. Intermediate the arms 16a, is an adjoining member with an aperture 16' therein concentric with the central axis. Extending horizontally from the lower portion of the mass is an arm 16b having an aperture concentric with the central axis A. Intermediate the upper and lower arms, is a notched-out portion for receiving the elongated pendulum 17 as will be described.

Pivotal mounting for the pendulum 16 is provided by shafts 18 and 19; the shaft 18 is seated at one end in the bearing 14 and at the other end in the concentric aperture 16' in the adjoining member of the upper arm 16a and the shaft 19 is seated at one end in the bearing 15 and at the other end in the aperture in the lower arm 16b. By this arrangement, the pendulum 16 is permitted complete freedom of rotation about the central axis A so that as the housing assembly is tilted from a vertical position, the pendulum 16 rotates about the central axis in the direction of inclination and comes to rest at the low point of the inclination.

Pendulum 17 is an elongated mass having a substantially trapezoidal cross-section with two upright arms 17a at the ends thereof with apertures 17a' therein concentric about the axis B and in alignment with apertures 16a' for pivotal engagement with pivotal pins 20 and 21. In this way, pendulum 17 is permitted freedom of movement about the axis B, but only within a restricted sector, limited on one side by a radial notch in the pendulum 16 and on the other by a stop mechanism (not shown) on the pendulum which engages the horizontal member 16a at a desired point. Accordingly, whereas the pendulum 16 is permitted complete freedom of rotary motion about the central axis, the pendulum 17 is permitted only a limited degree of motion about the orthogonal axis B.

The general shape of the pendulums 16 and 17 are not critical, except that, to obtain maximum sensivity within the confines of the housing assembly, it is desirable to configure the pendulums such that the maximum moment arm (distance from the pivotal point to the center of gravity) is obtained. This can be readily achieved by having the largest percentage on the mass (and hence the center of gravity) as near the outer edge of the pendulum as possible. In this way, the torque or product of the mass of the pendulum and the distance of its center of gravity from the central axis is a maximum. The torque may be further increased by constructing the pendulums of a high density material such as brass. By the orthogonal arrangement of the pendulums, during a tilt condition a portion of the mass of the pendulum 17 effectively combines with the mass of the pendulum 16 and thereby increases the total torque for the azimuthal pendulum 16.

When the central axis of the inclinometer assembly is in vertical alignment with the earth's gravitational vector, the pendulum 17 hangs vertically, seeking the low point in its arcuate path, but as the inclinometer assembly is tilted from its vertical position, the pendulum 17 pivots about its pivotal points 20 and 21 and continues to align itself with the earth's gravitational vector. At the same time, the pendulum 16 rotates about its pivotal points 14 and 15, always seeking the low point its azimuthal path. As a result thereof, the angular excursion of the pendulum 17 is then directly proportional to the magnitude of inclination and the azimuthal position of the pendulum 16 is directly proportional to the direction of inclination.

To provide remote indications of the magnitude and direction of inclination of the assembly from a vertical position, it is necessary that sensing devices be provided within the assembly to measure the postons of the pendulums relative to reference points. Toward this end, there is provided a potentiometer 22 for indicating azimuthal angle and a potentiometer 23 for indicating magnitude of inclination. The azimuthal potentiometer 22 is an annular shaped resistance element such as a wire-wound resistor, concentrically mounted to an insulated annular shaped disc 24 secured to the closure plate 12 by appropriate bonding means.

The inclination potentiometer 23 is a toroidal segment of a wire-wound resistor secured within an insulated channel 16c centrally located in the pendulum 16 and secured to the walls thereof by an appropriate bonding means. The manner of gaining electrical access to these potentiometers is illustrated in FIG. 3.

Referring now to FIG 3, there is shown a slip ring assembly comprising four slip rings of varying diameter numbered 25 through 28 concentrically mounted on the annular shaped insulated disc 24 and having insulated conductors 25a through 28a imbedded in the closure plate 12 for contact with the respective slip rings at one end and at the other end protruding through the top of closure plate for ready access to external electrical circuitry. Only conductors 25a and 27a are illustrated in FIG. 2, for purposes of drawing clarity, but each of the others are similarly arranged.

Electrical connection to each of the slip rings 25 through 28 and the azimuth potentiometer 22 is provided by five leaf spring circular segmented slip ring contactors indicated by numbers 25b through 28b and 22a, respectively, mounted on an insulated disc 29 which is secured concentrically to the shaft 18. Each of these contactors provides a low resistance friction contact with its respective slip ring and potentiometer so that constant electrical contact is made therewith as the azimuthal pendulum 16 rotates about its central axis.

The funuction of the slip ring assembly is to provide continuous electrical access to the potentiometers 22 and 23 so that the relative movement of the pendulums can be obtained as a function of a change in resistance on the potentiometers. To better understand how this function is provided, reference is made to FIG. 4 which illustrates a schematic diagram of the electrical connections between the potentiometers and the slip rings.

Referring now to FIG. 4, there is shown the inclination potentiometer 23 having its end terminals connected by conductors 23a and 23b to the terminals of slip ring contactors 27b and 28b, respectively, which as previously described engage slip rings 27 and 28 respectively. A wiper arm, 23c, illustrated in FIG. 2, is mechanically secured to the upper portion of the pendulum 17 so that as the pendulum 17 pivots about its orthogonal axis B, the wiper arm moves acros the windings of the potentiometer 23. Electrical contact is made with this wiper arm by an insulated conductor passing through a hole 17b centrally located in the pendulum 17; at the other side of the pendulum, a flexible conductor 25c, such as a spring, is provided for completing the electrical circuit with a terminal 25d of slip ring contactor 25b. In this manner, the movement of the pendulum 17 is not hindered by the electical connection therethrough. The contactor 23b is connected with the slip ring contactor 28b after first passing through a hole 17c in the lower portion of the pendulum.

Referring again to FIG. 4, the electrical schematic of the azimuthal pendulum 22 is illustrated as having its end terminals connected to terminals 30 and 31 which, although not shown in FIG. 2, protrude through the closure plate 12 for electrical access thereto as described previously with respect to terminals 25a through 28a. A wiper arm for the azimuthal potentiometer 22 is provided by the slip ring contactor 22a which by means of a short jumper along the bottom portion of the insulated disc 29 (not shown) is connected to the supporting terminal of slip ring contactor 26b and thence to slip ring 26 as illustrated. In this way, electrical contact with the wiper arm is available from the exterior of the closure plate 12.

Having thus described the mechanical and electrical arrangement of elements, the operation of the incli- nometer can now be readily appreciated. As described previously, when the central axis of the inclinometer is in alignment with the earth's gravitational vector, the inclination pendulum 17 hangs vertically. In this position, wiper arm 23c is approximately at the mid point of the potentiometer 23 and accordingly, the resistance measured between the wiper arm and either end of the potentiometer terminals is approximately equal. During calibration of the inclinometer, this resistance is measured and recorded so that a point of reference is available from which any degree of tilt may be measured. In a similar manner, the azimuth pendulum is aligned such that during this same condition the resistance measured between the wiper arm 22a and an end of the resistor, for example, is 0 ohms. The position of the azimuth pendulum during this condition is marked or scribed on the exterior housing of the assembly so that an external point of reference is provided. For purposes of simplicity, assume that during this aligned condition, the azimuthal pendulum is aligned with magnetic north; then, if the central axis of the assembly is inclined 45 degrees east of magnetic north, the resistance measured between terminals 26 and 30 or 26 and 31 will be changed by an amount directly proportional to this angle of inclination. Similarly, as a result of this inclination, the relative movement between pendulum 16 and pendulum 17 causes wiper arm 23c to move to a different position along potentiometer 23 and as a result thereof, the resistance measured between terminal 25 and 27 or 25 and 28 is changed. The percent of change is directly proportional to the angle of inclination.

In numerous applications of the invention, such as measuring the stability of an aircraft with reference to a longitudinal axis passing through the center of gravity of the aircraft, the relative motion between the aircraft and the inclinometer is fixed; however, there are certain contemplated applications of the invention in which it is impossible to determine where the reference mark is located relative to a fixed reference plane. For example, if the inclinometer is used in conjunction with a hydrophone array suspended below the surface of the water, and the array is permitted freedom of motion it is impossible to determine along which azimuth angle the array is tilting if there is no external point of reference remote from the inclinometer. For this reason, a magnetic compass 33 either formed as an integral part of the inclinometer assembly 10 or attached thereto by a connecting plate 34 is used to provide a remote plane of reference from which azimuth information about the array can be determined.

To make use of the magnetic compass 33, it is necessary that during the initial alignment, the azimutal pendulum 16 is oriented in some known relationship with the compass so that azimutal deviations from this relationship can be determined. For example, if the azimuthal pendulum 16 is aligned with magnetic north as indicated by the compass 33 when the central axis of the assembly is in a perfectly vertical position relative to the earth's gravity vector, then deviations from this opsition will be directly related to magnetic north. In general, the reference on the inclinometer assembly does not align itself with true north, this is particularly true in the case of an inclinometer suspended from a cable. In this event, it is first necessary to know the deviation of the reference mark on the inclinometer with respect to the magnetic north before the angle of inclination relative to magnetic north can be determined. A mechanism for automatically indicating the direction of inclination relative to magnetic north is illustrated in FIG. 5.

Referring now to FIG. 5, there is shown the output of the compass 33 and the azimuthal output of the inclinometer 10 in accordance with the present invention, connected to the inputs of a summing amplifier 37 which provides algebraic summing of the input signals. By this arrangement, the output of the summing amplifier is then a direct indication of the azimuth of inclination of the inclinometer which may then be displayed on a meter 38 for visually indicating the direction or azimuth angle of inclination. The magnitude of the inclination as indicated by the inclinometer 10 is displayed on a meter 39.

Although the invention has been described with respect to potentiometers 22 and 23 being used as sensing elements, it is to be understood that various other devices could also be employed, such as variable inductors or capacitors, magnetic pickups, or optical sensors with variable density film and a photosensitive pickup. In addition, it may be desirable in certain applications to damp the motion of the pendulum so as to provide a less sensitive device; to this end, the inside of the inclinometer assembly may be partially or completely filled with a viscous fluid, such as oil, with viscosity and quantity thereof providing the desired damping characteristics.

Obviously many modifications and variations of the present invention are possible in light of the above teachings. It is therefore to be understood, that the invention may be practiced otherwise than as specifically described.

What is claimed is:

1. A device for measuring magnitude and direction of inclination comprising:
   a housing assembly;
   a first eccentric mass rotatable within said assembly as a function of the direction of inclination in a plane normal to the gravity of the earth of said device;
   a second eccentric mass pivotally mounted within said first mass and rotatable about an axis orthogonal to the rotation of said first mass as a function of the magnitude of inclination of said device, said first eccentric being fully rotatable through 360° about a vertical axis parallel to the central axis of the device and said second eccentric mass is constrained in its rotation by the first mass; and
   means for sensing the motion of each of said eccentric masses relative to said assembly and providing outputs proportional to the magnitude and direction of inclination of said assembly, said outputs being a measure of the magnitude and direction of inclination of said assembly.

2. A device as recited in claim 1 further comprising:
   means for providing continuous electrical access to said means for sensing remote from said assembly.

3. A device as recited in claim 2 wherein said first eccentric mass comprises:
   a pair of arms extending from said first mass; and
   first pivotal means connected to said arms and secured to said assembly for enabling said first mass to rotate within said assembly about an axis passing longitudinally through said assembly.

4. A device as recited in claim 3 wherein said second eccentric mass comprises:
   a pair of arms extending from said second mass; and
   second pivotal means connected to said arms and secured to said first eccentric mass for rotation along an axis orthogonal to the axis of rotation of said first mass.

5. A device as recited in claim 4 wherein said means for sensing comprises:
   a first potentiometer concentrically mounted about the axis of rotation of said first mass, said potentiometer having a wiper arm in contacting relation therewith and wherein the position of said wiper arm relative to the ends of said potentiometer is proportional to the direction of inclination of said device relative to said assembly;
   a second potentiometer mounted within a channel in said first eccentric mass, said potentiometer having a wiper arm in contacting relation therewith and wherein the position of said wiper arm relative to the ends of said potentiometer is proportional to the magnitude of the inclination of said device relative to said assembly;
   a slip ring assembly, said assembly comprising a plurality of slip rings concentric about the axis of rotation of said first mass and secured within said assembly;

an insulated disc rotatable within said assembly in fixed relation with said first eccentric mass; and a plurality of contactor arms electrically connected to said potentiometers and in contacting relationship with said plurality of slip rings for providing continuous electrical connection therewith.

6. A device as recited in claim 5 wherein said means providing an indication of the position of said assembly comprises:

a compass means connected in fixed relation with said assembly and providing an output signal proportional to the deviation in orientation of said assembly relative to magnetic north;

means combining the output signal from said compass and a signal from said means for sensing proportional to the direction of inclination of said assembly; and means responsive to the output signal for indicating the direction of inclination of said assembly relative to magnetic north.

7. A device as recited in claim 6 further comprising:

meter means for indicating the magnitude of inclination of said assembly relative to the earth's gravity vector.

References Cited

UNITED STATES PATENTS

| | | |
|---|---|---|
| 1,310,444 | 7/1919 | Rohm. |
| 2,120,771 | 6/1938 | Thompson. |
| 2,171,156 | 8/1939 | Lawton. |
| 2,181,444 | 11/1939 | Zook. |
| 2,533,686 | 12/1950 | Peterson. |
| 2,823,464 | 2/1958 | Snodgrass _____ 33—204 |

FOREIGN PATENTS

| | | |
|---|---|---|
| 260,623 | 6/1913 | Germany. |

HARRY N. HAROIAN, Primary Examiner